United States Patent [19]

Braun et al.

[11] Patent Number: 4,778,640

[45] Date of Patent: Oct. 18, 1988

[54] METHOD OF SEQUENTIALLY MOLDING A RAZOR CAP

[75] Inventors: David B. Braun, Ridgefield; William E. Vreeland, Shelton; Vincent C. Motta, West Norwalk, all of Conn.

[73] Assignee: Warner-Lambert Company, Morris Plains, N.J.

[21] Appl. No.: 3,972

[22] Filed: Jan. 16, 1987

[51] Int. Cl.[4] .............................................. B29C 45/03

[52] U.S. Cl. .................................... 264/250; 264/267; 264/274

[58] Field of Search ........................ 264/250, 267, 274

[56] References Cited

U.S. PATENT DOCUMENTS

| | | | |
|---|---|---|---|
| 13,055 | 10/1905 | Struck | 264/274 |
| 4,170,821 | 10/1979 | Booth | 30/41 |
| 4,182,582 | 1/1980 | Youval et al. | 264/117 X |
| 4,343,754 | 8/1982 | Wilde et al. | 264/250 X |

*Primary Examiner*—Jan H. Silbaugh
*Assistant Examiner*—Yun H. Wang
*Attorney, Agent, or Firm*—Howard Olevsky; Gary M. Nath

[57] ABSTRACT

A lubricating strip having a honeycomb structure of polystyrene and a water soluble leachable shaving aid of high molecular weight polyethylene oxide is molded in situ on a razor cap made of thermoplastic material which has been previously injection molded.

2 Claims, 1 Drawing Sheet

METHOD OF SEQUENTIALLY MOLDING A RAZOR CAP

FIELD OF THE INVENTION

This invention relates to a razor cap which includes a lubricating element with the lubricating element being molded into a suitable cap receptacle.

BACKGROUND OF THE INVENTION

U.S. Pat. No. 4,170,821 issued Oct. 16, 1979 describes a razor cartridge having a cap with a lubricating composition. It also describes the incorporation of this agent in a water insoluble microporous substrate.

Commercially available razors of this type namely Gillette ATRA PLUS and Schick ULTREX PLUS provide the combination of a lubricating strip which is subsequently affixed to the razor cap. This strip, containing the shaving aid which is polyethylene oxide having a molecular weight between 100,000 and 6,000,000, is released from a microporous substrate, i.e., typically polystryrene by leaching.

The process for manufacturing a razor having such a lubricating strip employs first, injection molding of the cap and then the separate attachment of the strip. The strip is attached either by the use of acrylate adhesives or by mechanical means. When an adhesive is utilized, the combination of the strip and cap must be properly positioned after the adhesive is applied and then clamped for a period of time to allow the initial adhesive bonding to occur. This process has the disadvantage of the extra cost associated with the use of the adhesive as well as the separate steps utilized to mate and cure the adhesive.

A mechanical attachment means usually involves a slot defining a recess in the top surface of the cap generally extending longitudinally along the cap length and a positioning means either at the end of the recess or at the bottom of the recess or in both places. The strip which is separately manufactured and which is either extruded or injection molded is cut, positioned and retained usually by means of tabs or the like which can be bent over a portion of the strip to retain it.

Ideally, the steps relating to the marriage of the separately formed strip and cap would be avoided if the strip could be molded in the same machine after molding of the cap had been completed. While the mixture of polyethylene oxide and polystyrene can be rendered plastic and deformable, attempts to sequentially mold the polystyrene polyethylene combination have run into some substantial difficulties.

One of the problems inherent in attempting to injection mold a polyethylene oxide compound is that high molecular weight polyethylene oxides are preferred for this particular application because they have the desired rate of water solubility. Lower molecular weight polyethylene oxide compounds, i.e., those near the bottom of the range disclosed n the above mentioned Booth patent, tend to rapidly leach out of the polystyrene open-celled matrix or honeycomb structure and may be essentially "used up" before the number of shaves contemplated by the particular blade assembly is completed.

The desired, high molecular weight polyethylene oxide is, unfortunately, highly susceptible to chain scission which reduces its molecular weight and consequently its efficacy as a shaving aid. In the thermoplastic state, high molecular weight polyethylene oxide has an extremely high melt viscosity. Therefore, in order to sequentially mold the lubricating strip onto the razor cap, it is necessary to use very high injection molding temperatures to achieve the necessary melt flow to successfully complete the injection molding of the strip. This combination of high temperature and shear exposure accelerates the degradation of the polyethylene oxide via chain scisson. This problem could be substantially reduced if the temperatures used for injection molding were substantially reduced.

Another problem associated with the use of very high injection molding temperatures in the sequential molding process is the potential thermal distortion of the previously molded cap during the sequential molding of the lubricating strip.

For these reasons, and the obvious energy savings, it is highly desirable to be able to substantially reduce the injection molding temperatures used to form the lubricating strip.

SUMMARY OF THE INVENTION

According to this invention a lubricating strip comprising a honeycomb structure of polystyrene and a water soluble leachable shaving aid of high molecular weight polyethylene oxide is molded in situ on a razor cap made of thermoplastic material which has been previously injection molded.

Injection molding is performed in such a manner that a suitable receptacle for the lubricating strip is provided on the cap and the strip is maintained in place after forming. A strip with projections depending downward through suitable orifices positioned within the receptacle portion of the cap can provide the necessary anchoring of strip to cap.

The ability to preserve the high molecular weight polyethylene oxide results, according to this invention, from the inclusion of up to 10 % of suitable plasticizers as will be discussed in more detail below.

BRIEF DESCRIPTION OF THE DRAWINGS

The invention can be more readily understood by reference to the drawings in which.

DETAILED DESCRIPTION OF THE INVENTION AND DRAWINGS

Figure 1:
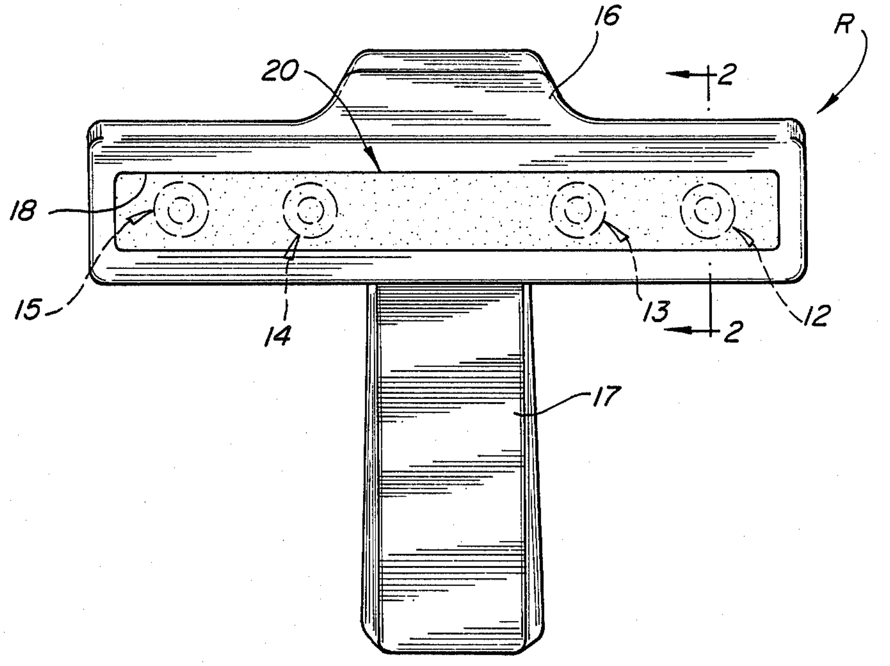
FIG. 1 is a plan view of a razor cap with lubricating insert.
Figure 2:
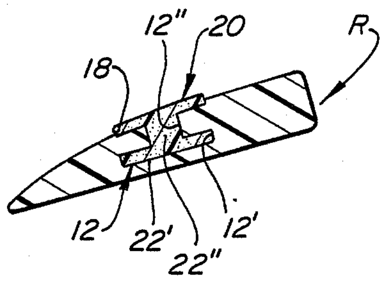
FIG. 2 is a cross sectional view taken along lines 2—2 of FIG. 1.
Figure 3:
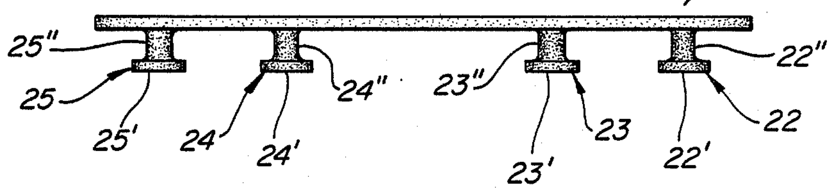
FIG. 3 is a view of a molded polyethylene oxide insert made according to this invention.

As can be seen from FIG. 1, a razor structure R is provided with handle 17 connected to razor cap 20 by neck 16 (connecting means not shown). The lubricating strip 20 is deposited along a longitudinal line in recess area 18 and is retained in place and anchored through T-shaped anchor means 12, 13, 14 and 15 respectively. As can be seen by reference to FIG. 2, a typical anchoring means 12 may be generally T-shaped and contains a neck portion 22" and a wider portion 22'. These anchors which may extend under the bottom surface of the cap and flow along to define a mold area within the cap or may be positioned within a hollow receiving portion within the thickness of the cap itself as shown in FIG. 2 serve to maintain the injection molded polystyrene-polyethylene oxide strip in its position on the cap within recess 18. FIG. 3 shows an illustration of the molded strip as it would appear if separate from the cap portion. As can be seen therein a series of T-shaped anchors 22, 23, 24, and 25 designed to mate with cap slots 12, 13, 14, and 15 respectively are designed so that the neck portion of the T represented by 22", 23", 24", 25" are positioned within the slots and the strip is retained by the spread out anchor portions 22', 23', 24', 25' shaped as the cross bar portion of the T.

The particular configuration of the molded anchors are illustrative only and are apparent to those skilled in the art that any anchor can be used in which the bottom portion represented hereby 22', 23', 24' and 25' is wider than the respected mating orifices 12, 13, 14, and 15 through which the injection molded strip is anchored. The number of orifices is not critical except, with regard to their location, it is preferred that they be positioned essentially symmetrically about the transverse center of the razor cap to maintain resistance to torque forces which may be applied to the strip during shaving.

The method according to this invention resides in the sequential molding of a razor cap and, subsequently, a lubricating strip positioned in appropriately predesigned areas on the top of the cap. As can be seen by reference to the drawing particularly FIGS. 1 and 2, a cap is formed with a receiving area by injection molding and, subsequently a mixture of polystyrene and polyethylene oxide along with suitable amounts of acceptable plasticizers present from 0.1 to about 10% by weight of the polystyrene-polyethylene oxide plasticizer mixture is prepared as a fluid for a second stage injection molding operation. The receiving cavity for this second stage is formed in part by the injection molded cap. (For purposes of this invention, when a cap is referred to it is designed to encompass any other part of the injection molded razor assembly which provides part of a molding operation preceding the molding of the lubricating strip to the cap.

The use of a plasticizer in the polystyrene-polyethylene oxide mixture is absolutely critical to bring about the desired reduction in injection molding temperatures and the previously described performance and processing benefits derived therefrom must be water soluble and compatible with polyethylene oxide and also cosmetically acceptable. By "cosmetically acceptable" it is meant that the use of the plasticizer in the indicated amounts of 0.1 to 10% by weight of the polyethylene oxide-polystyrene mixture will not generally produce irritation to the skin of the majority of the users of the shaving implement. The plasticizer must also have one additional characteristic and that is it must be substantially incompatible with polystyrene. If the plasticizer is imprisoned in the polystyrene matrix ithas no effect on the polyethylene oxide. Of course, plasticizers which are compatible with both polyethylene oxide and polystyrene which are also cosmetically acceptable could be used if present in relatively high levels but obviously this is undesirable because high levels of plasticizers could adversely affect both the polyethylene oxide fraction and the polystyrene portion.

The use of the plasticizers allows the utilization of substantially lower temperatures during the time of processing to produce a flowability of the polyethylene oxide without substantially reducing its molecular weight and performance in the lubricating strip.

Preferred plasticizers are polyethylene glycol particularly with molecular weight between 400 and 20,000, water soluble polypropylene glycol particularly with molecular weight between 400 and 4,000, water-soluble copolymers of ethylene and propylene oxide, water-soluble aklyl phenol ethoxylates, glycerine, sorbitol and water.

Particularly preferred plasticizers are propylene glycol and octyl phenol ethoxylate with 9 moles of ethylene oxide. This latter plasticizer is commercially available under the trade name Triton ×-100 from Rohm and Haas Company, Philadelphia, Pa. It is also possible to use water as a plasticizer although the use of water requires a change in certain of the process parameters. Particularly preferred plasticizers are propylene glycol and Triton ×100. With regard to each specific plasticizer flowability at a given temperature increases with the amount of plasticizer added as will be shown in the example set forth below.

EXAMPLE 1

A series of runs were made in which the level of high molecular weight polyethyleneoxide, polystyrene and propylene glycol was varied within the ranges in the table set forth below.

A small amount of 3,5,-di tertbutyl-p-cresol, commonly known as butylated hydroxy toluene or BHT, was added to the composition as an oxidation inhibitor for the composition.

In order to determine the effect of plasticizers on the injection molding temperatures required to successfully sequentially mold the lubricating strip onto at least the cap, the runs were conducted on a commercial injection molding machine. Temperatures of the different sections of the machine were varied to determine the minimum temperatures for sequentially molding lubricating strips.

The table below presents the compositions tested in the manner described above, showing the minimum acceptable temperatures necessary for successful sequential molding of the lubricating strip:

TABLE I

| | COMPOSITION | | | | MINIMUM ACCEPTABLE MOLDING MACHINE TEMPERATURES | | | | |
|---|---|---|---|---|---|---|---|---|---|
| Sample No. | Poly(styrene) % | Poly(ethylene-oxide), % | Propylene Glycol, % | BHT % | Rear °F. | Front °F. | Nozzle °F. | Sprue °F. | Mold °F. |
| 1 | 19.9 | 80 | 0 | 0.1 | 360 | 390 | 400 | 510 | 75 |
| 2 | 24.9 | 75 | 0 | 0.1 | 360 | 390 | 400 | 510 | 75 |
| 3 | 29.9 | 70 | 0 | 0.1 | 360 | 390 | 400 | 510 | 75 |
| 4 | 19.9 | 75 | 5 | 0.1 | 320 | 330 | 330 | 430 | 75 |
| 5 | 24.9 | 70 | 5 | 0.1 | 320 | 330 | 330 | 430 | 75 |
| 6 | 29.9 | 65 | 5 | 0.1 | 320 | 330 | 330 | 425 | 75 |
| 7 | 19.9 | 70 | 10 | 0.1 | 310 | 320 | 320 | 380 | 75 |
| 8 | 24.9 | 65 | 10 | 0.1 | 320 | 330 | 330 | 425 | 75 |

The table shows that the introduction of 5% plasticizer enabled a reduction in the minimum acceptable injection molding machine temperatures of 40° F. at the rear of the machine and 80° F. at the nozzle and sprue.

Addition of 10% plasticizer enabled reduction in the minimum acceptable molding machine temperatures by 50° F. at the rear of the machine and 85°-130° F. at the nozzle and sprue.

EXAMPLE 2

A two-minute water immersion laboratory test is used to evaluate the efficacy of inserts and assess their ability to release polyethylene oxide during shaving. A minimum of 70% water weight gain is required for an insert to be efficacious (perceived as providing significant lubrication to the shaver during the act of shaving). Water immersion values for the listed compounds are as follows:

| Compound | % Weight Gain 2-Min. Water Immersion Test |
|---|---|
| 1 | 84 |
| 2 | 92 |
| 3 | 67 |
| 4 | 78 |
| 5 | 74 |
| 6 | 73 |
| 7 | 92 |
| 8 | 65 |

The table shows when comparing Compound 3 (no plasticizer) to 6 (5% propylene glycol) that the plasticized compound is more efficacious (73% water absorption vs. 67%) and it can be molded at nozzle and sprue temperatures of 70° F. and 85° F., respectively, below the non-plasticized formulation.

The introduction of 10% propylene glycol (compare compound 1 to compound 7) permits a reduction in nozzle and sprue temperatures of 80° F. and 130° F., respectively, while slightly increasing efficacy.

We claim:

1. A method for sequentially injection molding a lubricating strip and at least a plastic razor cap with orifices for anchoring said strip positioned longitudinally across the cap comprising:

(a) molding at least said cap with orifices spaced along a recessed area longitudinally along the cap; and (b) injecting a mixture of polystyrene, high molecular weight polyethylene oxide and from 0.1 to about 10% by weight of the mixture of a water soluble cosmetically acceptable polystyrene incompatible plasticizer at temperatures sufficient to produce flowability of the polyethylene oxide without substantially reducing its molecular weight during said injecting, said mixture forming and flowing into said orifices to anchor said strip to said cap.

2. The method of claim 1 wherein the mixture is formed with particulate polystyrene.

* * * * *